United States Patent
Yang et al.

(10) Patent No.: US 9,910,975 B2
(45) Date of Patent: Mar. 6, 2018

(54) METHOD FOR AUTHENTICATING USER USING ICON COMBINED WITH INPUT PATTERN, AND PASSWORD INPUT DEVICE

(71) Applicant: Rowem Inc., Guro-gu, Seoul (KR)

(72) Inventors: Giho Yang, Seoul (KR); Jaeyeob Hwang, Goyang-si (KR)

(73) Assignee: Rowem Inc. (KR)

( * ) Notice: Subject to any disclaimer, the term of this patent is extended or adjusted under 35 U.S.C. 154(b) by 13 days.

(21) Appl. No.: 14/395,410

(22) PCT Filed: Apr. 18, 2013

(86) PCT No.: PCT/KR2013/003286
§ 371 (c)(1),
(2) Date: Oct. 17, 2014

(87) PCT Pub. No.: WO2013/157864
PCT Pub. Date: Oct. 24, 2013

(65) Prior Publication Data
US 2015/0135291 A1    May 14, 2015

(30) Foreign Application Priority Data

Apr. 18, 2012 (KR) .................. 10-2012-0040580
Apr. 17, 2013 (KR) .................. 10-2013-0042457

(51) Int. Cl.
*G06F 7/04* (2006.01)
*G06F 21/36* (2013.01)
(Continued)

(52) U.S. Cl.
CPC ............... *G06F 21/36* (2013.01); *G06F 3/02* (2013.01); *G06F 3/04817* (2013.01);
(Continued)

(58) Field of Classification Search
CPC ......................................................... G06F 21/36
(Continued)

(56) References Cited

U.S. PATENT DOCUMENTS 5,821,933 A * 10/1998 Keller ................. G06F 3/04817
707/999.009
7,240,367 B2 * 7/2007 Park ........................ G06F 21/36
726/18
(Continued)

FOREIGN PATENT DOCUMENTS

JP    2003-067341    3/2003
JP    2003-122721    4/2003
(Continued)

OTHER PUBLICATIONS

Haichang Gao et al., "Design and Anlalysis of a Graphical Password Scheme," IEEE Computer Society, 2009, pp. 675-678.*
(Continued)

*Primary Examiner* — Luu Pham
*Assistant Examiner* — Canh Le
(74) *Attorney, Agent, or Firm* — Thorpe North & Western

(57) ABSTRACT

A password input device comprises a storage unit for storing character strings according to each icon; an input window generation unit for generating and displaying an input window on which a plurality of icons are arranged; a secret icon recognition unit which confirms a shift coordinate value and recognizes icons, which are arranged on coordinates inversely moved up to the shift coordinate value from a coordinate value at which a selected icon is arranged, as secret icons selected by the user if the user selects the icon; and an authentication processing unit which confirms a character string corresponding to each secret icon recognized in the secret icon recognition unit, generates a combined character string in which the one or more confirmed (Continued)

character strings are arranged, and authenticates the user by confirming whether the generated combined character string is consistent with the user's password stored in the storage unit.

6 Claims, 11 Drawing Sheets

(51) Int. Cl.
  *G06F 21/31* (2013.01)
  *G06F 3/0481* (2013.01)
  *G06F 3/02* (2006.01)
  *H04L 29/06* (2006.01)
  *H04L 9/32* (2006.01)

(52) U.S. Cl.
  CPC ............ *G06F 21/31* (2013.01); *H04L 9/3226* (2013.01); *H04L 9/3228* (2013.01); *H04L 63/083* (2013.01)

(58) Field of Classification Search
  USPC .......................................................... 726/6
  See application file for complete search history.

(56) References Cited

U.S. PATENT DOCUMENTS

| | | | | |
|---|---|---|---|---|
| 2002/0029341 | A1* | 3/2002 | Juels | G06F 21/36 713/184 |
| 2004/0030934 | A1* | 2/2004 | Mizoguchi | G06F 21/36 726/18 |
| 2004/0117633 | A1 | 6/2004 | Rohrbach | |
| 2004/0230843 | A1* | 11/2004 | Jansen | G06F 21/36 726/7 |
| 2006/0143467 | A1 | 6/2006 | Kubo et al. | |
| 2008/0052245 | A1* | 2/2008 | Love | G06F 21/36 705/76 |
| 2008/0184363 | A1 | 7/2008 | Narasimhan | |
| 2008/0250481 | A1* | 10/2008 | Beck | H04L 63/083 726/6 |
| 2009/0036100 | A1 | 2/2009 | Lee | |
| 2009/0320126 | A1 | 12/2009 | Harada | |
| 2010/0011419 | A1 | 1/2010 | Seo | |
| 2010/0073126 | A1 | 3/2010 | Morin et al. | |
| 2010/0180336 | A1* | 7/2010 | Jones | H04L 9/3226 726/19 |
| 2013/0047237 | A1* | 2/2013 | Ahn | H04L 9/3226 726/7 |

FOREIGN PATENT DOCUMENTS

| | | |
|---|---|---|
| JP | 2010-003259 | 1/2010 |
| KR | 10-2005-0023747 | 3/2005 |
| KR | 10-2008-0011342 | 2/2008 |
| KR | 10-2009-0013432 | 2/2009 |
| KR | 10-2009-0131702 | 12/2009 |
| KR | 10-2011-0040265 | 4/2011 |
| KR | 10-2011-0083356 | 7/2011 |

OTHER PUBLICATIONS

Tzong-Sun Wu, "Shoulder-surfing-proof graphical password authentication scheme," Springer, 2014, pp. 245-254.*
International Search Report for International Application Serial No. PCT/KR2013/003286, 4 pages, Korea.
Wayne Jansen, Authenticating Mobile Device Users Through Image Selection, The National Institute of Standards and Technology, Oct. 30, 2009, Untied States.
Wayne Jansen, Serban Gavrila, Vlad Korolev, Rick Ayers and Ryan Swanstrom, Picture Password: A Visual Login Technique for Mobile Devices, The National Institute of Standards and Technology, Jul. 1, 2003, United States.
Xiaoyuan Suo, Ying Zhu, and G. Scott. Owen, Graphical Passwords: A Survey, Department of Computer Science, Georgia State University, Dec. 5, 2005, United States.

* cited by examiner

| ICON | CHARACTER STRING |
|---|---|
| % | g1f10 |
| R | k1939 |
| ◇ | 48#2a |
| ☉ | 98a*6 |
| ※ | 29#!A |
| ♀ | 43~88 |
| X | 13&&k |
| ∇ | k39ee |
| ♥ | bYdk# |
| P | mc839 |
| ♠ | 839Cz |
| ☞ | 93dcz |
| ☎ | z838$ |
| ☆ | $zi3;c |
| ▣ | ckd98 |
| ♨ | kck32 |

METHOD FOR AUTHENTICATING USER USING ICON COMBINED WITH INPUT PATTERN, AND PASSWORD INPUT DEVICE

CROSS-REFERENCE TO RELATED APPLICATION

The present application claims priority to Korean Patent Application No. 10-2012-0040580 filed on Apr. 18, 2012 in the Republic of Korea, and Korean Patent Application No. 10-2013-0042457 filed on Apr. 17, 2013 in the Republic of Korea, the disclosures of which are incorporated herein by reference.

BACKGROUND

1. Field of the Invention

The present disclosure relates to password input technology, and more particularly, to a user authentication method using an icon combined with an input pattern to safely protect a password of a user from shoulder surfing and hacking and a password input device.

2. Description of the Related Art

As a common method for user authentication, a password authentication method is being used. The password authentication method stores a password initially inputted from a user, compares a user inputted password to the previously stored password whenever needed, and when they are identical, and determines that the password authentication is successful. Also, technology for authenticating a user using a touch pattern set by the user, evolved from a traditional password authentication method, was disclosed. Korean Patent Application Publication No. 10-2009-0013432 discloses a mobile terminal for authenticating a user using a pattern and its locking and unlocking method.

However, a password has various probabilities of leak. For example, a password may be stolen from a third party having peeped a password input process of a user. Also, a password key-entered in a user terminal may be hacked by a hacking program.

Accordingly, there is a need for a password authentication method which deactivates a password of a user leaked to a third party, and along with this, technique for generating a character string for a password not leaked to a third party and linking with an external server.

SUMMARY

The present disclosure is designed to solve the problem of the related art, and therefore the present disclosure is directed to providing a user authentication method for authenticating a user using an icon combined with an input pattern to safely protect a password of the user from shoulder surfing and hacking and a password input device.

Also, the present disclosure is directed to providing a user authentication method which recognizes a secret icon based on a masquerading icon inputted from a user and a shift coordinate value set by the user, generates a complex character string based on the secret icon, and uses it as a password of the user, and a password input device.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

To achieve the objects, there is provided a password input device according to a first aspect of the present disclosure including a storage unit configured to store a character string for each icon, an input window generation unit configured to generate and display an input window where a plurality of icons is placed, a secret icon recognition unit configured to ascertain a shift coordinate value, and when a user selects an icon on the input window, to recognize an icon placed at coordinates moved back by the shift coordinate value from a coordinate value at which the selected icon is placed, as a secret icon selected by the user, and an authentication processing unit configured to authenticate the user by ascertaining a character string corresponding to each secret icon recognized by the secret icon recognition unit in the storage unit, generating a combination character string in which the at least one ascertained character string is arranged, and ascertaining whether the generated combination character string matches a password of the user stored in the storage unit.

To achieve the objects, there is provided a password input device according to a second aspect of the present disclosure including a storage unit configured to store a character string for each icon, an input window generation unit configured to generate and display an input window where a plurality of icons is placed, a secret icon recognition unit configured to ascertain a shift coordinate value, and when a user selects an icon on the input window, to recognize an icon placed at coordinates moved back by the shift coordinate value from a coordinate value at which the selected icon is placed, as a secret icon selected by the user, and an authentication request unit configured to ascertain a character string corresponding to each secret icon recognized by the secret icon recognition unit in the storage unit, generate a combination character string in which the at least one ascertained character string is arranged, and transmit the generated combination character string as a password of the user to an authentication server.

To achieve the objects, there is provided a method for authenticating a user using an icon combined with an input pattern according to a third aspect of the present disclosure including a displaying step of generating and displaying an input window where a plurality of icons is placed, a coordinate value ascertaining step of ascertaining a shift coordinate value set by the user, a recognizing step of, when the user selects an icon on the input window, recognizing an icon placed at coordinates moved back by the shift coordinate value from a coordinate value at which the selected icon is placed, as a secret icon selected by the user, a generating step of ascertaining a character string corresponding to the at least one secret icon recognized in the recognizing step, and generating a combination character string in which the ascertained character string is arranged, and an authentication processing step of performing authentication of the user using the generated combination character string.

The present disclosure has an advantage of minimizing the probability that a third party will find out a password of a user using information of the user (for example, a birthday, a resident registration number, an address, a telephone number, etc.), by generating a combination character string of a complex shape based on a plurality of secret icons selected by the user, and setting the generated combination character string as a password of the user.

Also, the present disclosure has an effect of providing convenience to a user by generating a same password of a complex type over and over again and using it as authentication information of the user, only if the user recognizes a secret icon set by the user with no need to know an actual password of a complex type generated by a password input device.

Furthermore, the present disclosure has an advantage of preventing a secret icon of a user from being leaked to a third party, by inducing the user to select a masquerading icon rather than an actual secret icon.

Moreover, because the password input device according to the present disclosure generates a password of a complex type using a character string corresponding to a secret icon, the present disclosure has a benefit of protecting an actual password of a user more safely due to non-disclosure of a character string corresponding to a secret icon set by the user even if the secret icon set by the user is leaked to outside.

Particularly, the present disclosure has an effect of protecting a secret icon set by a user from other user more safely by frequently changing a shift coordinate value based on first icon selection information of the user.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

FIG. 2 is a diagram illustrating character string information according to an exemplary embodiment of the present disclosure.

FIG. 4 is a diagram illustrating an input window where each icon is placed according to an exemplary embodiment of the present disclosure.

DETAILED DESCRIPTION

The foregoing objects, features, and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily obscure the essence of the disclosure, its detailed description is omitted herein. Hereinafter, an exemplary embodiment of the present disclosure is described in detail with reference to the accompanying drawings.

Throughout the specification, unless otherwise defined, the term "comprising" as used herein specifies the presence of stated components, but do not preclude the presence or addition of one or more components. Furthermore, it should be understood that the term " . . . unit", "module", or the like as used herein is intended to refer to a processing unit of at least one function or operation, and may be implemented in either hardware, a combination of hardware and software, or software.

Figure 1:
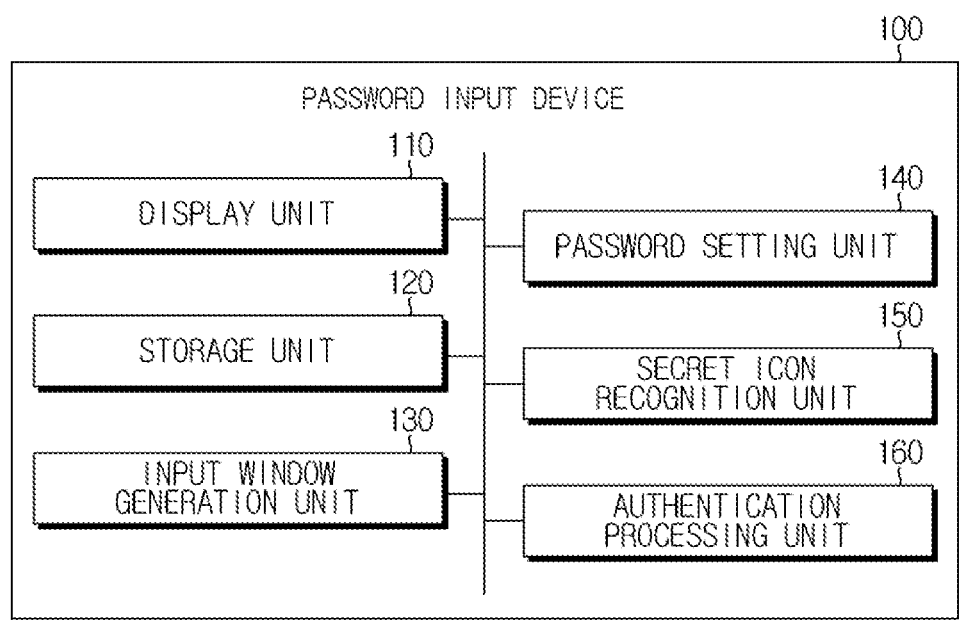
FIG. 1 is a diagram illustrating a configuration of a password input device according to an exemplary embodiment of the present disclosure.

FIG. 1 is a diagram illustrating a configuration of a password input device according to an exemplary embodiment of the present disclosure.

The password input device 100 may be widely applied to a wired/wireless information communication terminal, for example, a laptop computer, a desktop computer, a tablet computer, a mobile communication terminal and other mobile terminals, or electric/electronic devices with a processor and a memory, for example, an automated teller machine (ATM), a door lock, a smart TV, a credit card settlement terminal, and the like.

Referring to FIG. 1, the password input device 100 includes a display unit 110, a storage unit 120, an input window generation unit 130, a password setting unit 140, a secret icon recognition unit 150, and an authentication processing unit 160.

The display unit 110 is a display means based on liquid crystal display (LCD) technology, light emitting polymer display (LPD) technology, or the like, and outputs various types of information processed by the password input device 100. Also, the display unit 110 displays an input window where a plurality of icons is placed. The display unit 110 may be a touch display. Here, the icon is a graphic-based text, number, or image, and represents a means for receiving an input of a password from a user and is placed on the input window. The icon is classified into a secret icon set by the user, and a masquerading icon for preventing the secret icon from being leaked to outside.

The storage unit 120 is a storage means such as a rapid random access memory, a magnetic disk storage device, a flash memory device, or the like, and stores input pattern setting information and the password of the user. Also, the storage unit 120 stores character string information where a character string is recorded for each icon.

FIG. 2 is a diagram illustrating character string information according to an exemplary embodiment of the present disclosure.

Referring to FIG. 2, character string information corresponding to each icon is recorded in character string information of the storage unit 120. That is, each ion has a unique character string. For example, among the icons shown in FIG. 2, an icon '%' corresponds to a character string 'g1f10', and an icon 'R' corresponds to a character string 'k1939'.

Preferably, the character string information is stored differently for each password input device 100. For example, in the case of differing password input devices 100, different character strings are stored for even an icon of a same shape.

The input window generation unit 130 performs a function of generating an input window where icons are placed and displaying it on the display unit 110. Particularly, the input window generation unit 130 generates an input window where icons get shuffled and are located at random and displays it on the display unit 110.

The password setting unit 140 ascertains character strings corresponding to a plurality of secret icons initially set by the user in the character string information of the storage unit 120, sets a combination character string of an array of the ascertained character strings as a password of the user, and stores it in the storage unit 120. That is, when the user sequentially selects a plurality of secret icons through the input window, the password setting unit 140 ascertains character strings each corresponding to the secret icons in the character string information of the storage unit 120. Also, the password setting unit 140 generates a combination character string in which the ascertained character strings are arranged in a selection order of the secret icons, sets the generated combination character string as a password of the user, and stores it in the storage unit 120.

Also, the password setting unit 140 receives input pattern setting information from the user, and stores the input pattern setting information in the storage unit 120. In this instance, the password setting unit 140 may receive, from the user, an input of fixed input pattern information in which a shift coordinate value is recorded as the input pattern setting information, or may receive, from the user, an input of variable input pattern information in which a shift coordinate value is not recorded as the input pattern setting information.

The secret icon recognition unit 150 performs a function of recognizing the secret icons selected by the user based on the shift coordinate value. Specifically, when fixed input pattern information as the input pattern setting information of the user is stored in the storage unit 120, the secret icon recognition unit 150 ascertains the shift coordinate value recorded in the fixed input pattern information, and recognizes the secret icons selected by the user by moving back on the input window by the shift coordinate value based on coordinates of masquerading icons selected by the user.

In contrast, when variable input pattern information as the input pattern setting information is stored in the storage unit 120, the secret icon recognition unit 150 compares coordinates of a masquerading icon selected by the user on the input window for the first time to coordinates of a first secret icon set by the user, and temporarily sets movement distance coordinates from the coordinates of the first secret icon to the coordinates of the masquerading icon as a shift coordinate value. Also, the secret icon recognition unit 150 recognizes the secret icons selected by the user by moving the temporarily set shift coordinate value back from coordinates of masquerading icons selected by the user on the input window for the second and subsequent times.

When the secret icon recognition unit 150 recognizes each of the secret icons selected by the user, the authentication processing unit 160 ascertains character strings each corresponding to the secret icons in the character string information of the storage unit 120, and generates a combination character string in which each of the ascertained character strings is arranged in an input order of the secret icons. Also, the authentication processing unit 160 compares the generated combination character string to the password of the user stored in the storage unit 120, and when they are identical, determines that authentication succeeds, and when they are not identical, determines that authentication fails.

Figure 3:
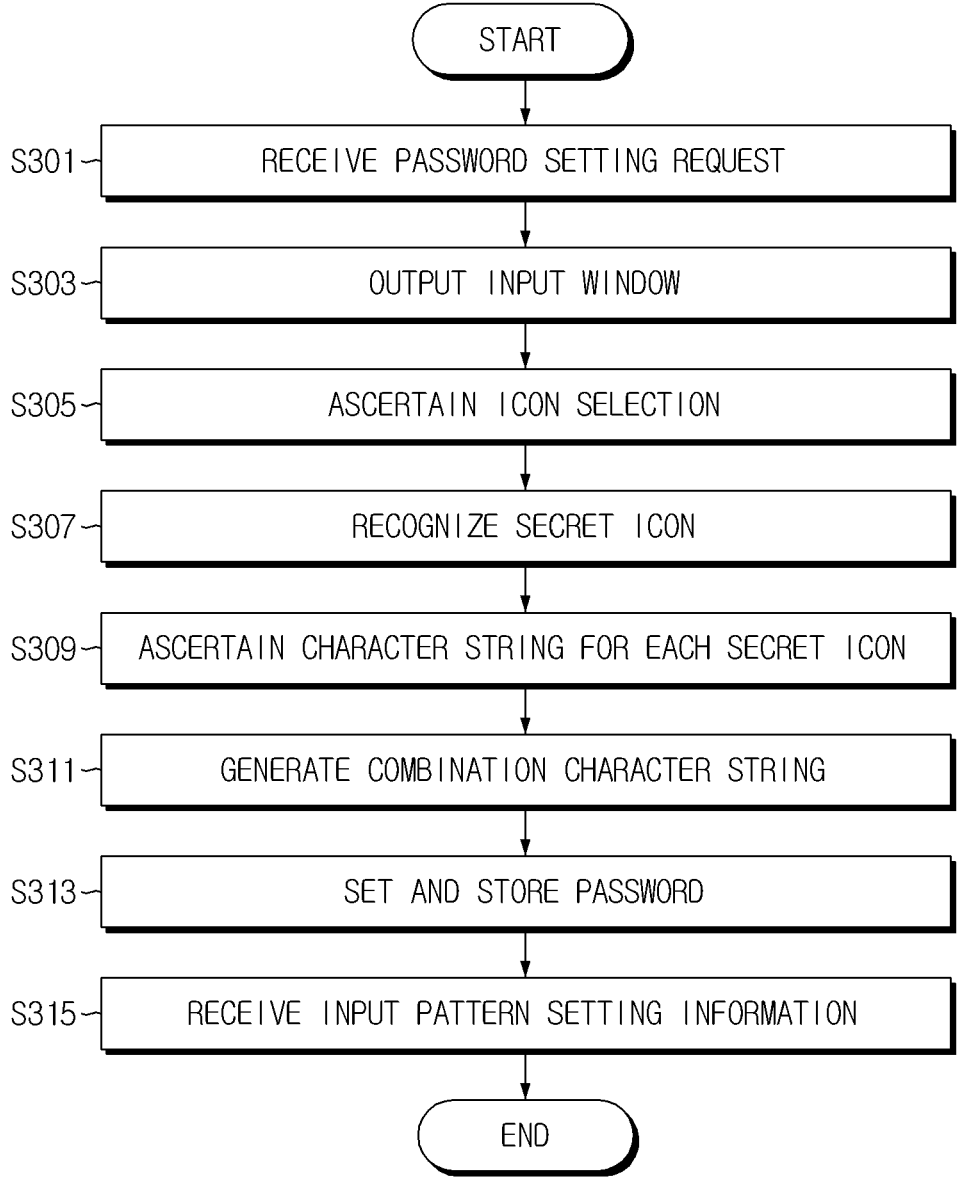
FIG. 3 is a flowchart illustrating a method of setting and storing a password of a user through an icon in a password input device according to an exemplary embodiment of the present disclosure.

FIG. 3 is a flowchart illustrating a method of setting and storing a password of a user through an icon in the password input device according to an exemplary embodiment of the present disclosure.

Referring to FIG. 3, the password input device 100 receives a request for password setting from the user (S301).

Then, the password setting unit 140 commands the input window generation unit 130 to output an input window, and the input window generation unit 130 outputs an input window where a plurality of icons are placed to the display unit 110 (S303). Alternatively, the password setting unit 140 may output an input window where each icon is located at random to the display unit 110.

Figure 4:
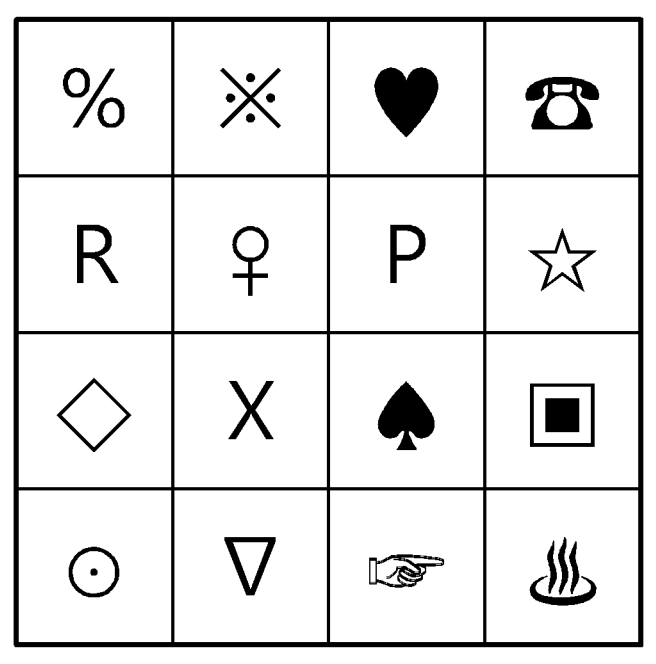

FIG. 4 is a diagram illustrating an input window where each icon is placed according to an exemplary embodiment of the present disclosure.

As shown in FIG. 4, the input window generation unit 130 outputs an input window where each icon gets shuffled and is placed at random to the display unit 110. Although FIG. 4 shows that 16 icons of a 4*4 size are placed, the present disclosure is not limited thereto and input windows of various sizes (for example, 5*5, 5*4, 6*6, etc.) may be outputted. Also, an icon is placed at each coordinates, and the input window generation unit 130 changes the coordinates of each icon frequently and places the icons on the input window at random. Here, the coordinates represent an x-axis coordinate and a y-axis coordinate.

Subsequently, the password setting unit 140 monitors icon selection information of the user inputted on the input window (S305), and when the user sequentially selects a plurality of icons, the password setting unit 140 recognizes the plurality of icons selected by the user on the input window as a secret icon set by the user (S307). That is, when the user sequentially selects a plurality of icons on the input window being outputted to the display unit 110, the password setting unit 140 recognizes the plurality of icons selected by the user as a secret icon set by the user.

Subsequently, the password setting unit 140 ascertains character strings each corresponding to the secret icons in character string information of the storage unit 120 (S309). Subsequently, the password setting unit 140 generates a combination character string in which the character strings each corresponding to the secret icons sequentially selected by the user are arranged in a selection order of the secret icons, sets the generated combination character string as a password of the user, and stores it in the storage unit 120 (S311, S313). In this instance, the password setting unit 140 may encrypt the combination character string, i.e., the password of the user, and store it in the storage unit 120.

For example, when character string information is as shown in FIG. 2 and icons '%', 'R', 'X', and 'P' are sequentially selected as a secret icon for a password of a user, the password setting unit 140 ascertains that character strings corresponding to the secret icons '%', 'R', 'X', and 'P' are 'g1f10', 'k1939', '13&&k', and 'mc839', respectively, in the character string information of the storage unit 120, and generates a combination character string 'g1f10k193913&&kmc839' in which the character strings are arranged in a selection order of the icons. Also, the password setting unit 140 sets the generated combination character string 'g1f10k193913&&kmc839' as a password of the user, and stores it in the storage unit 120.

Subsequently, the password setting unit 140 outputs a message requesting input pattern setting to the display unit 110, receives input pattern setting information from the user, and stores the input pattern setting information in the storage unit 120 (S315). In this instance, the password setting unit 140 may receive, from the user, an input of fixed input pattern information in which a shift coordinate value is recorded as the input pattern setting information, or may receive, from the user, an input of variable input pattern information in which a shift coordinate value is not recorded as the input pattern setting information.

Preferably, when an input of fixed input pattern information is received from the user, the password setting unit 140 may output an input pattern setting window to the display unit 110, and receive a setting of a shift coordinate value from the user through the input pattern setting window.

Figure 5:
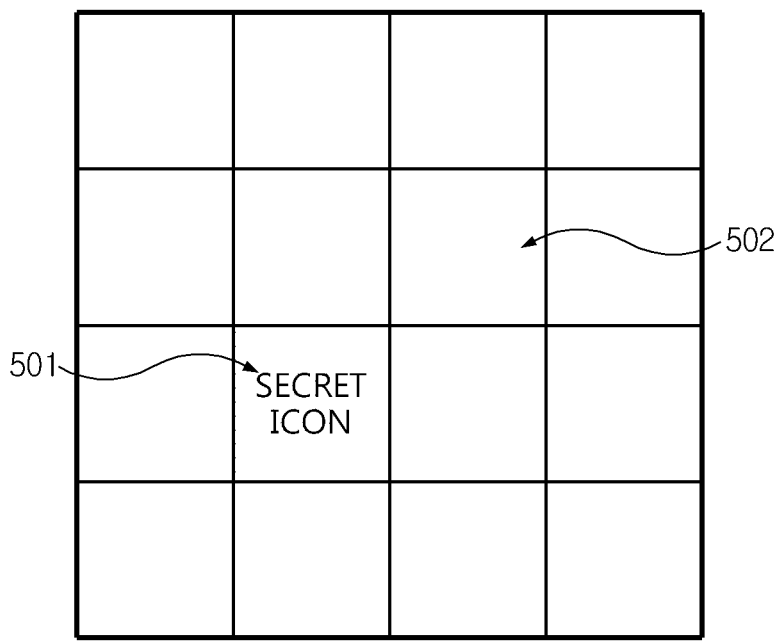
FIG. 5 is a diagram illustrating an input pattern setting window according to an exemplary embodiment of the present disclosure.

FIG. 5 is a diagram illustrating an input pattern setting window according to an exemplary embodiment of the present disclosure.

Referring to FIG. 5, the password setting unit 140 outputs an input pattern setting window as shown in FIG. 5 to the display unit 110, and when any one coordinates are selected on the outputted input pattern setting window, the password setting unit 140 sets a movement distance coordinate value from coordinates of a secret icon 501 to a selected coordinate value as shift coordinates of the user. For example, when the user selects an area 502 corresponding to the coordinates (3,3) on the input pattern setting window of FIG. 5, the password setting unit 140 sets movement distance coordinates (1,1) from coordinates (2,2) of the secret icon to the (3,3) as shift coordinates of the user.

The password input device 100 according to the present disclosure minimizes the probability that other user will find out a password of a user using information of the user (for example, a birthday, a resident registration number, an address, a telephone number, etc.), by generating a combination character string of a complex type in which character strings each corresponding to a plurality of icons selected by the user are placed, and setting the generated combination character string as a password of the user. Particularly, according to the present disclosure, only if the user recognizes secret icons set by the user, with no need to know an actual password of a complex type (i.e., a combination character string), the user may generate a previously generated password (i.e., a combination character string) through the password input device 100.

Figure 6:
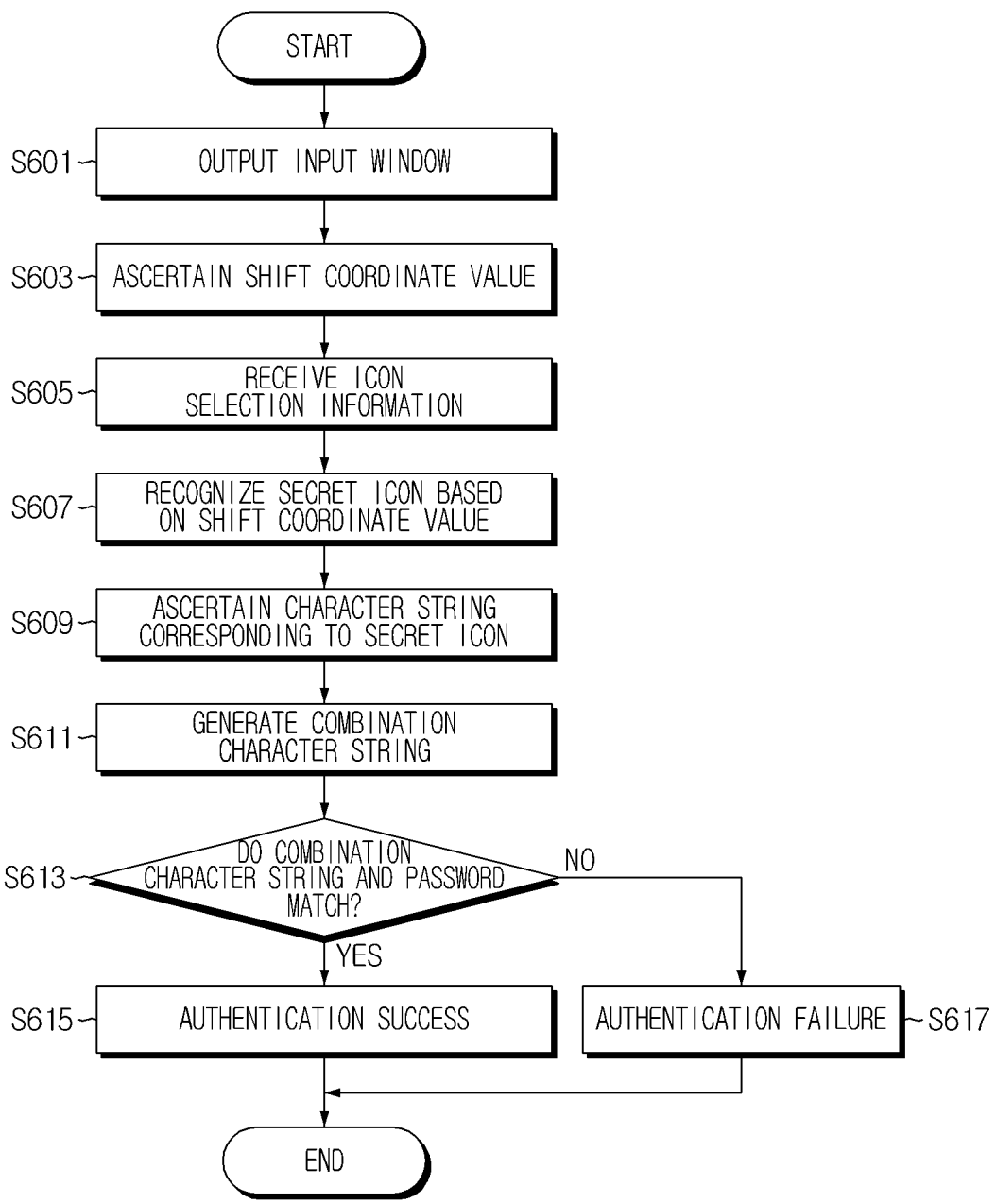
FIG. 6 is a flowchart illustrating a method of authenticating a user based on a password combined with a fixed input pattern in a password input device according to an exemplary embodiment of the present disclosure.

FIG. 6 is a flowchart illustrating a method of authenticating a user based on a password combined with a fixed input pattern in the password input device according to an exemplary embodiment of the present disclosure.

Referring to FIG. 6, the input window generation unit 130 of the password input device 100 outputs an input window where a plurality of icons gets shuffled and is placed at random to the display unit 110 (S601). In this instance, the password input device 100 outputs an input window where a plurality of secret icons and masquerading icons set by the user is located at random to the display unit 110. Here, the secret icon represents an icon set by the user upon generating a password, and the masquerading icon represents an icon other than the secret icon.

Figure 7:
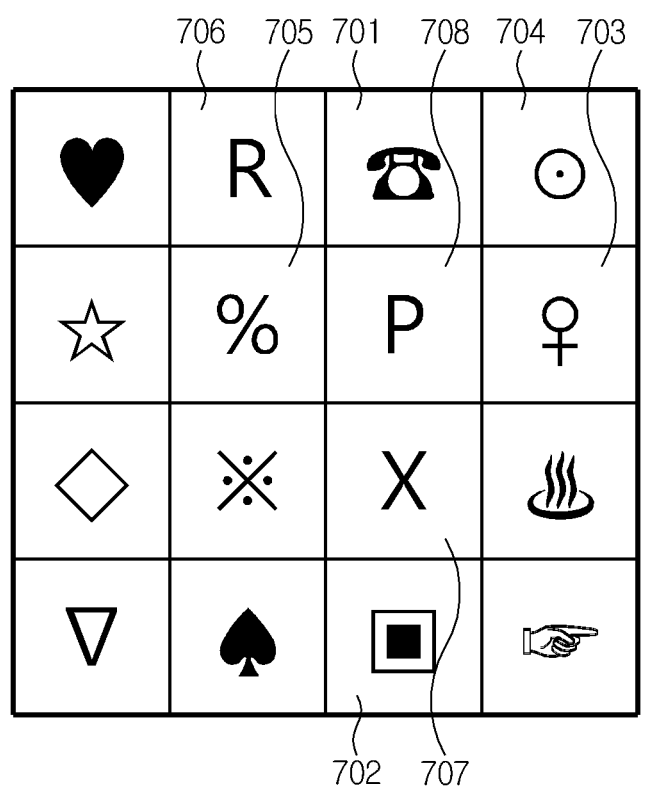
FIG. 7 is a diagram illustrating an input window where each icon is placed at random according to an exemplary embodiment of the present disclosure.

FIG. 7 is a diagram illustrating an input window where each icon is placed at random according to an exemplary embodiment of the present disclosure, and as shown in FIG. 7, the input window generation unit 130 generates an input window where each icon gets shuffled and is arranged at each coordinates and outputs it to the display unit 110. When comparing the input window of FIG. 7 to the input window of FIG. 4, the icon placed on the input window of FIG. 7 and the icon placed on the input window of FIG. 4 differ in location.

Subsequently, the secret icon recognition unit 150 ascertains fixed input pattern information set by the user in the storage unit 120, and ascertains a shift coordinate value recorded in the fixed input pattern information (S603).

Subsequently, the secret icon recognition unit 150 monitors icon selection information of the user inputted through the input window (S605), and when a plurality of masquerading icons is sequentially selected, the secret icon recognition unit 150 recognizes each of actually inputted secret icons by reverse calculation of the ascertained shift coordinate value (S607). That is, when the user sequentially selects a plurality of masquerading icons on the input window, the secret icon recognition unit 150 recognizes icons placed at coordinates obtained through reverse calculation by the shift coordinate value from coordinates of each of the selected masquerading icons, respectively, as a secret icon the user intends to actually select.

Assuming the shift coordinates set by the user are (1,1) and the secret icons set by the user are '%', 'R', 'X', and 'P', a description is provided with reference to FIG. 7 by way of illustration. When instead of a secret icon 705 of '%' shape, a masquerading icon 701 of a telephone shape placed at the coordinates (3,4) moved by (1,1) from the coordinates of the secret icon 705 is selected as first icon selection information, the secret icon recognition unit 150 recognizes that the secret icon 705 (i.e., %) at the coordinates (2,3) moved back by the shift coordinates (1,1) from the (3,4) has been selected.

Also, when the user selects, as second icon selection information, a masquerading icon 702 placed at the coordinates (3,1) moved by the coordinates (1,1) from the coordinates (2,4) of a secret icon 706, the secret icon recognition unit 150 recognizes that the secret icon 706 (i.e., R) placed at the coordinates (2,4) moved back by the coordinates (1,1) from the (3,1) has been selected. In this case, the secret icon recognition unit 150 recognizes that the coordinates moved from the coordinates (2,4) to (1,1) is (3,1) by applying a rolling scheme, and recognizes the coordinates moved back from the coordinates (3,1) to (1,1) as the coordinates (2,4).

Also, when the user selects, as third icon selection information, a masquerading icon 703 placed at the coordinates (4,3) moved by (1,1) from the coordinates of a secret icon 707 rather than the secret icon 707, the secret icon recognition unit 150 recognizes that the secret icon 707 (i.e., X) placed at the coordinates (3,2) moved back by the shift coordinates (1,1) from the (4,3) has been selected. Similarly, when the user selects, as fourth icon selection information, a masquerading icon 704 placed at the coordinates (3,3) moved back by the shift coordinates (1,1) from the coordinates (3,3) of a secret icon 708, the secret icon recognition unit 150 recognizes that the secret icon 708 (i.e., P) has been selected.

In this way, when the secret icon recognition unit 150 recognizes the secret icons sequentially selected by the user, the authentication processing unit 160 ascertains character strings each corresponding to the secret icons in the character string information of the storage unit 120, and generates a combination character string in which the character strings are each arranged in a recognition order of the secret icons (S609, S611). For example, when the character string information is as shown in FIG. 2 and the secret icons sequentially recognized based on the masquerading icons selected by the user and the shift coordinate value are '%', 'R', 'X', and 'P', the authentication processing unit 160 ascertains that character strings corresponding to the secret icons '%', 'R', 'X', 'P' are 'g1f10', 'k1939', '13&&k', and 'mc839', respectively, in the character string information of the storage unit 120, and generates a combination character string 'g1f10k193913&&kmc839' in which the character strings are each arranged in a recognition order of the secret icons.

Subsequently, the authentication processing unit 160 determines whether the generated combination character string matches the password of the user stored in the storage unit 120 (S613). Subsequently, when the combination character string matches the password of the user stored in the storage unit 120, the authentication processing unit 160 determines that authentication succeeds, and proceeds with a process subsequent to authentication success (for example, unlocking, cash withdrawal permission, account transfer permission, security turn-off, etc.) (S615).

In contrast, when the combination character string does not match the password of the user stored in the storage unit 120, the authentication processing unit 160 outputs an authentication failure message to the display unit 110 or a speaker (not shown) (S617).

In this instance, when selection of one icon on the input window is completed, the input window generation unit 130 may repetitively output an input window where each icon is re-located at random to the display unit 110. That is, when the user selects a first icon on the input window, the input window generation unit 130 may generate an input window where each icon is re-located at random and output it to the display unit 110, and afterwards, when another icon is selected, generate an input window where each icon are re-located at random and output it to the display unit 110.

As described in the foregoing, the user selects a masquerading icon rather than an actual secret icon based on the shift coordinate value preset by the user, to prevent the secret icon of the user from being leaked to other users. Also, because the present disclosure generates a password using the character strings corresponding to the secret icons, even if the secret icon set by the user is leaked to outside, the character string corresponding to the secret icon cannot be recognized by other users, and an actual password can be safely protected from hacking by a third party.

Figure 8:
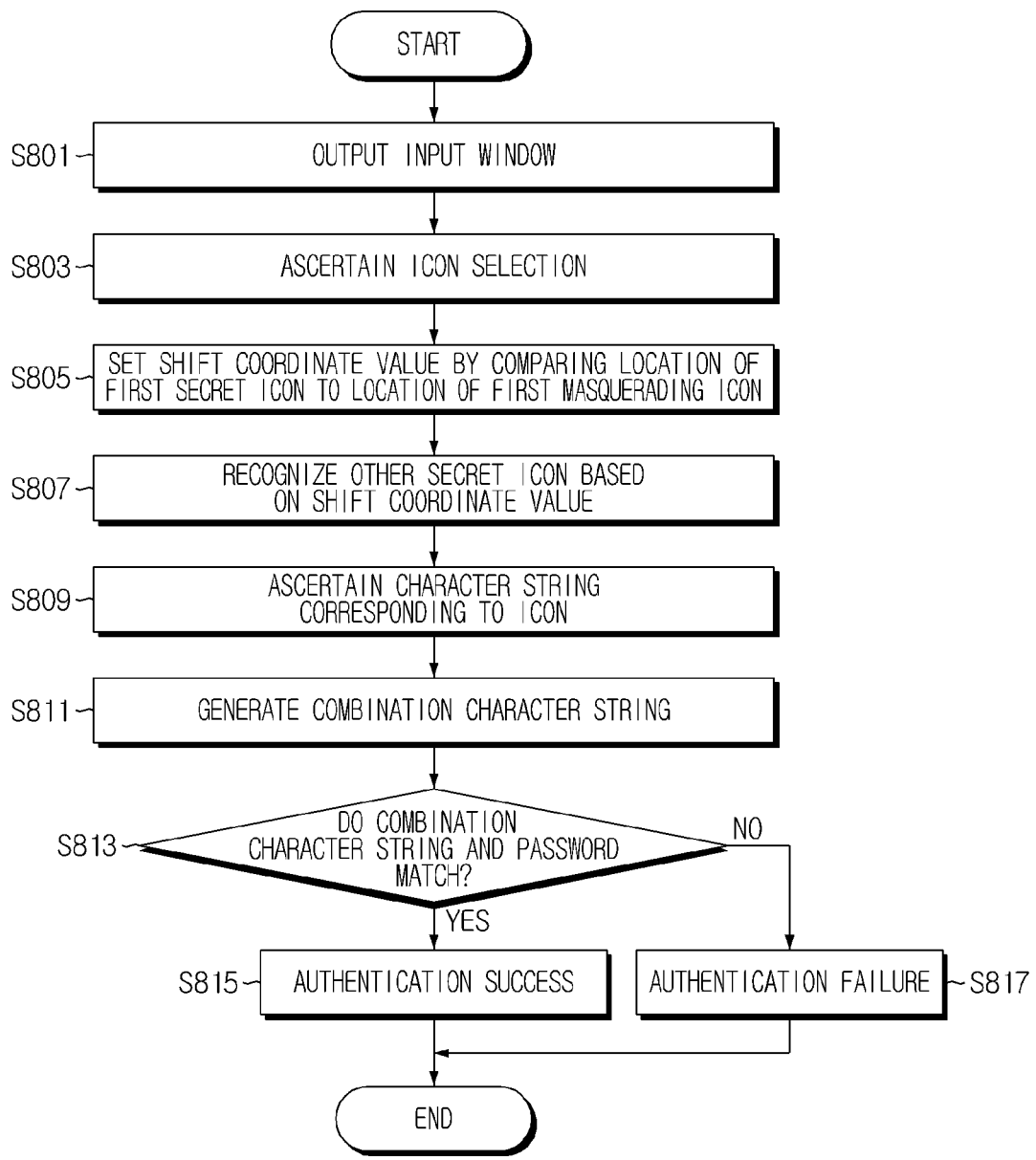
FIG. 8 is a flowchart illustrating a method of authenticating a user based on a password combined with a variable input pattern in a password input device according to an exemplary embodiment of the present disclosure.

FIG. 8 is a flowchart illustrating a method of authenticating a user based on a password combined with a variable input pattern in the password input device according to an exemplary embodiment of the present disclosure.

Referring to FIG. 8, the input window generation unit 130 of the password input device 100 outputs an input window where secret icons and masquerading icons are placed at random to the display unit 110 (S801).

Subsequently, the secret icon recognition unit 150 ascertains that the user has set a variable input pattern in input pattern setting information of the storage unit 120, and ascertains masquerading icons inputted from the user by monitoring icon selection information of the user inputted on the input window (S803).

Also, the secret icon recognition unit 150 temporarily sets a shift coordinate value by comparing coordinates of a masquerading icon selected by the user for the first time to coordinates of a secret icon of the user set for the first time (S805). That is, the secret icon recognition unit 150 ascertains the coordinates of the first secret icon set by the user and the coordinates of the masquerading icon selected by the user on the input window outputted to the display unit 110, and temporarily sets a movement distance coordinate value from the coordinates of the first secret icon to the coordinates of the masquerading icon as a shift coordinate value. Additionally, when the secret icon recognition unit 150 pre-recognizes a first secret icon set by the user, if a first masquerading icon is selected by the user on the input window, the secret icon recognition unit 150 temporarily sets a shift coordinate value based on coordinates of the masquerading icon and coordinates of the first secret icon set by the user.

Describing with reference to FIG. 7 again by way of illustration, when the first secret icon set by the user is the icon 705 and the first masquerading icon selected by the user is the icon 701, the secret icon recognition unit 150 temporarily sets a movement distance coordinate value (1,1) from the coordinates (2,3) of the secret icon 705 to the coordinates (3,4) of the masquerading icon 701 as a shift coordinate value. As another example, when the first secret icon set by the user is the icon 705 and the first masquerading icon selected by the user is the icon 703, the secret icon recognition unit 150 temporarily sets a movement distance coordinate value (2,0) from the coordinates (2,3) of the secret icon 705 to the coordinates (4,3) of the masquerading icon 703 as a shift coordinate value.

Subsequently, secret icon recognition unit 150 ascertains secret icons for masquerading icons selected by the user for the second and subsequent times based on the temporarily set shift coordinate value (S807). That is, the secret icon recognition unit 150 ascertains coordinates of each of second and subsequent masquerading icons among the plurality of masquerading icons sequentially selected by the user on the input window, and recognizes icons placed at coordinates moved back by the set shift coordinate value from the coordinates of the masquerading icons, respectively, as a secret icon actually selected by the user.

In this way, when the secret icon recognition unit 150 finishes recognizing the secret icons from first to last, the authentication processing unit 160 ascertains character strings each corresponding to the recognized secret icons in the character string information of the storage unit 120, and generates a combination character string in which the character strings are arranged in a recognition order of the secret icons (S809, S811).

Subsequently, the authentication processing unit 160 determines whether the generated combination character string matches a password of the user stored in the storage unit 120 (S813). Subsequently, when the combination character string matches the password of the user stored in the storage unit 120, the authentication processing unit 160 determines that authentication succeeds, and proceeds with a process subsequent to authentication success (for example, unlocking, cash withdrawal permission, account transfer permission, security turn-off, etc.) (S815).

In contrast, when the combination character string does not match the password of the user stored in the storage unit 120, the authentication processing unit 160 outputs an authentication failure message to the display unit 110 or a speaker (not shown) (S817).

In this instance, when the user finishes selecting one icon on the input window, the input window generation unit 130 may repetitively output an input window where each icon is re-located at random to the display unit 110. That is, when the user selects a first icon on the input window, the input window generation unit 130 may generate an input window where each icon is re-located at random and output it to the display unit 110, and afterwards, when a subsequent icon is selected in due turn, re-generate an input window where each icon is placed at random and outputs it to the display unit 110.

The present disclosure, to which the variable input pattern of FIG. 8 is applied, protects the secret icons set by the user more safely from other users by changing the shift coordinate value frequently based on the first icon selection information of the user.

In this instance, the method of inputting the password associated with the input pattern according to the present disclosure may be applied to a network environment.

Figure 9:
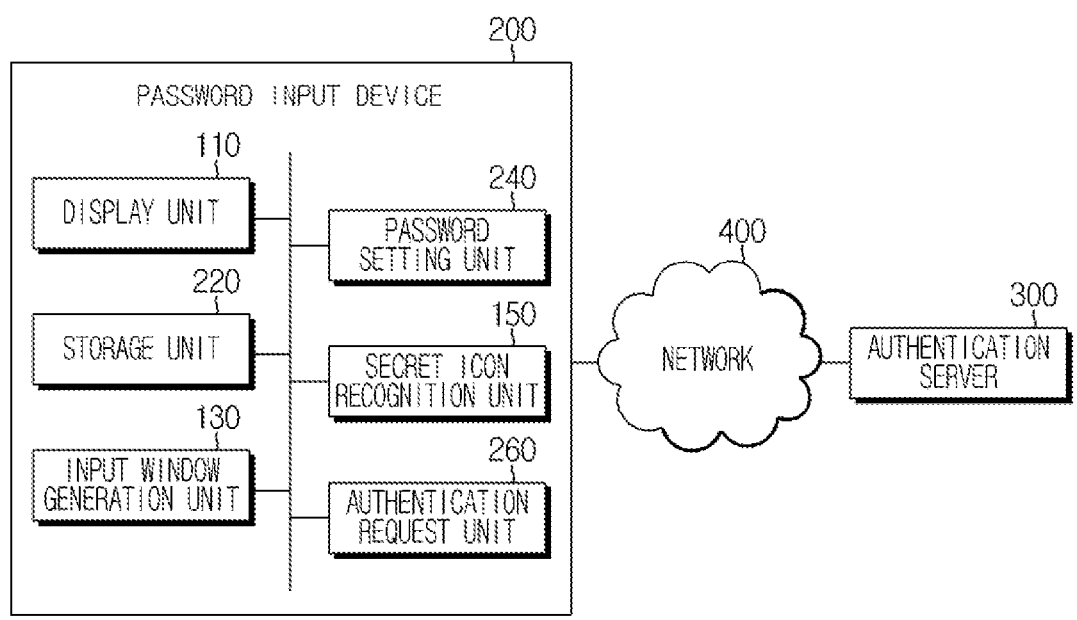
FIG. 9 is a diagram illustrating a configuration of an authentication system according to another exemplary embodiment of the present disclosure.
Figure 10:
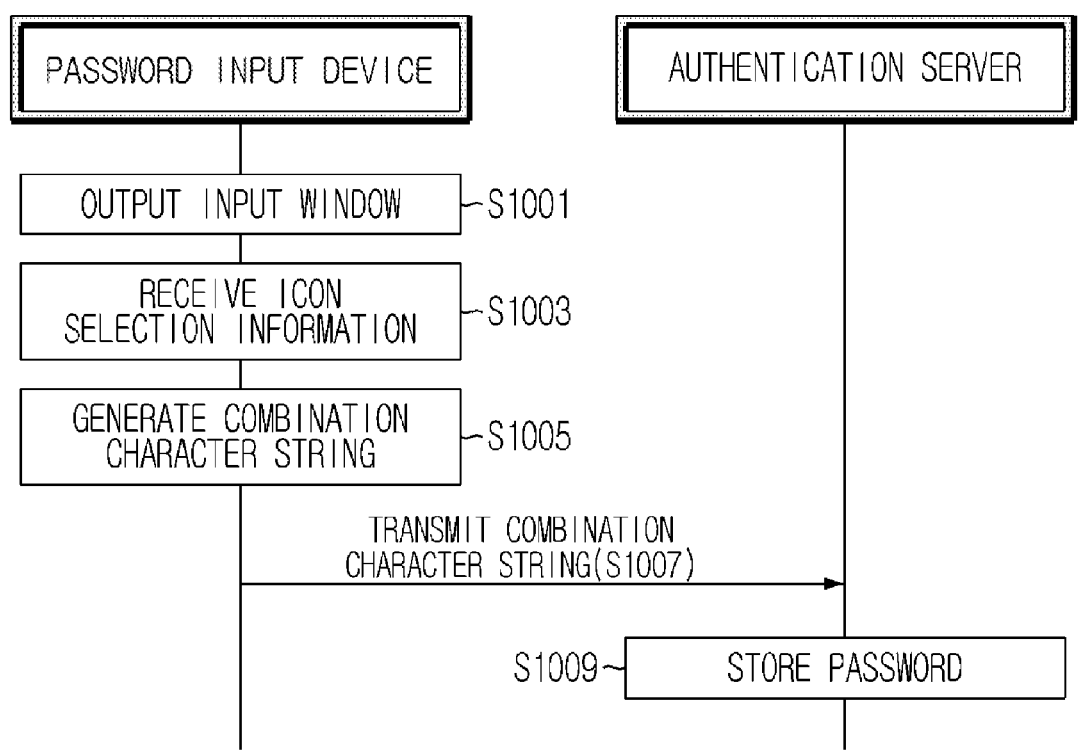
FIG. 10 is a flowchart illustrating a method of setting a password in an authentication system according to another exemplary embodiment of the present disclosure.
Figure 11:
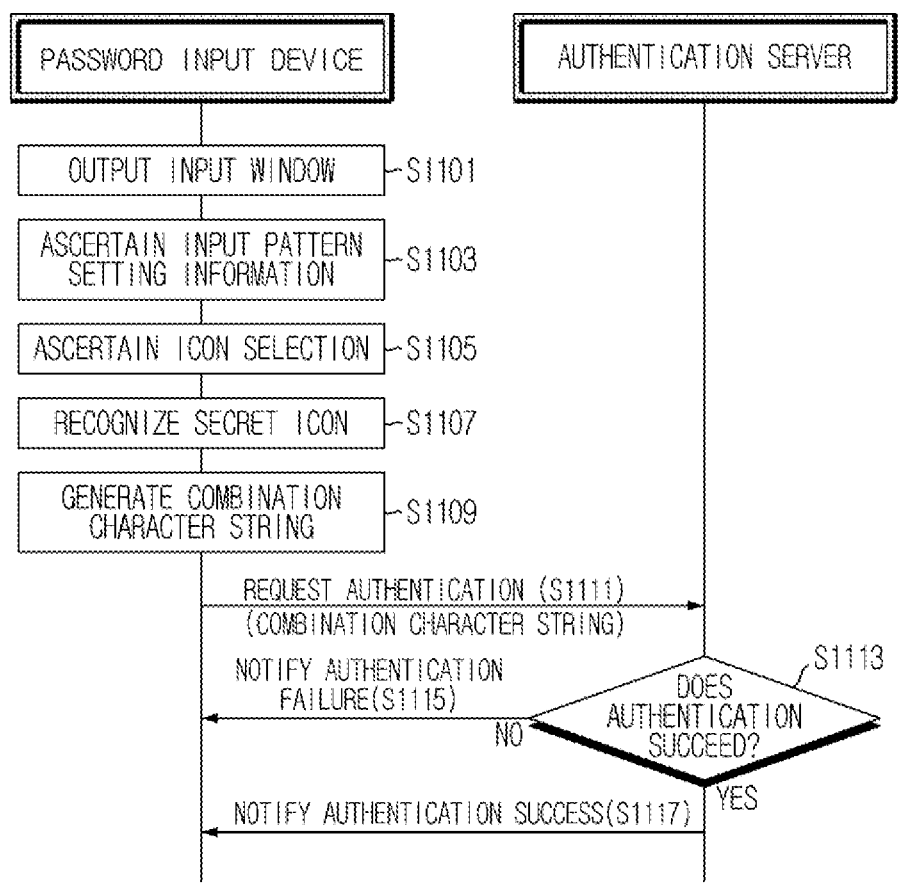
FIG. 11 is a flowchart illustrating a method of authenticating a user using a password combined with an input pattern in an authentication system according to another exemplary embodiment of the present disclosure.

In the description with reference to FIGS. 9 through 11, the description is made based on that the password input device is a device capable of making a network communication.

In another exemplary embodiment with reference to FIGS. 9 through 11, an overlapping description with the exemplary embodiments described with reference to FIGS. 1 through 8 is abridged and briefly provided.

FIG. 9 is a diagram illustrating a configuration of an authentication system according to another exemplary embodiment of the present disclosure.

Among the elements included the password input device 200 shown in FIG. 9, elements having the same reference numbers as FIG. 1 perform the same function as those described with reference to FIG. 1, and its detailed description is omitted herein.

Referring to FIG. 9, the authentication system according to another exemplary embodiment of the present disclosure includes a password input device 200 and an authentication server 300. The password input device 200 and the authentication server 300 communicate with each other via a network 400. Here, the network 400 includes a mobile communication network and a wired/wireless broadband Internet network, and corresponds to a well-known technology in the present disclosure, and thus, its detailed description is omitted herein.

The authentication server 300 receives a password of a user from the password input device 200, and authenticates the user.

The password input device 200 receives a selection of secret icons from the user through an input window where a plurality of icons is placed, and provides the authentication server 300 with a combination character string of an array of character strings corresponding to the selected secret icons as a password of the user to.

The password input device 200 includes a display unit 110, a storage unit 220, an input window generation unit 130, a password setting unit 240, a secret icon recognition unit 150, and an authentication request unit 260.

The storage unit 220 stores input pattern setting information of the user, and stores character string information where a character string is recorded for each icon.

The password setting unit 240 ascertains character strings each corresponding to a plurality of secret icons initially selected by the user in the character string information of the storage unit 220, and transmits a combination character string, in which the ascertained character strings are arranged in an input order of the icons, as a password set by the user to the authentication server 300, to allow the password of the user to be stored in the authentication server 300.

When the secret icon recognition unit 150 recognizes each of the secret icons selected by the user, the authentication request unit 260 requests user authentication to the authentication server 300 by ascertaining the character strings each corresponding to the secret icons in the character string information of the storage unit 220, generating a combination character string in which the character strings are each arranged, and transmitting the generated combination character string to the authentication server 300.

FIG. 10 is a flowchart illustrating a method of setting a password in the authentication system according to another exemplary embodiment of the present disclosure.

Referring to FIG. 10, after the password input device 200 connects to the authentication server 300, the password input device 200 receives a request for password setting from the authentication server 300. In this instance, when a procedure for initial setting of a login password or change of the set password is carried out, the password input device 200 may receive a request for password setting from the authentication server 300.

Then, the input window generation unit 130 of the password input device 200 outputs an input window where each icon gets shuffled and is placed at random to the display unit 110 (S1001).

Subsequently, the password setting unit 240 monitors icon selection information of the user inputted on the input window (S1003), and when icon selection information is sequentially received from the user, the password setting unit 240 recognizes a plurality of icons inputted by the user on the input window as a secret icon set by the user. Subsequently, the password setting unit 240 ascertains character strings each corresponding to the secret icons in character string information of the storage unit 220, and generates a combination character string in which the ascertained character strings are arranged in a selection order of the secret icons (S1005).

Subsequently, the password setting unit 240 transmits the generated combination character string as a password to the authentication server 300 (S1007). Then, the authentication server 300 stores the received combination character string as a password of the user (S1009).

In this instance, when the user attempts to sign up to the authentication server 300, the password input device 200 further transmits an identification (ID) set by the user to the authentication server 300, and the authentication server 300 stores the ID and the combination character string (that is, the password) together.

FIG. 11 is a flowchart illustrating a method of authenticating a user using a password combined with an input pattern in the authentication system according to another exemplary embodiment of the present disclosure.

Referring to FIG. 11, when the password is registered on the authentication server 300 according to the process of FIG. 10, if the user makes an authentication attempt to the authentication server 300, the input window generation unit 130 of the password input device 200 outputs an input window where a plurality of icons gets shuffled and is placed at random to the display unit 110, so as to receive an input of the password from the user (S1101).

Subsequently, the secret icon recognition unit 150 ascertains input pattern setting information in the storage unit 220, and ascertains whether the input pattern setting information is fixed input pattern information or variable input pattern information (S1103). Subsequently, the secret icon recognition unit 150 ascertains a plurality of masquerading icons selected by the user by monitoring icon selection information of the user being inputted on the input window (S1105).

Subsequently, the secret icon recognition unit 150 recognizes each secret icon placed at the coordinates moved back by a shift coordinate value from the coordinates of each masquerading icon based on the input pattern setting information set by the user (S1107). In this instance, when the input pattern setting information is a fixed input pattern, the secret icon recognition unit 150 ascertains a shift coordinate value recorded in the fixed input pattern, and ascertains, as a secret icon actually selected by the user, icons placed at coordinates moved back by the shift coordinate value based on coordinates of each masquerading icon selected by the user.

In contrast, when the input pattern setting information is variable input pattern information, the secret icon recognition unit 150 ascertains coordinates of a first secret icon set by the user and coordinates of a masquerading icon selected by the user on the input window, and temporarily sets a movement distance coordinate value from the coordinates of the first secret icon to the coordinates of the masquerading icon selected by the user as the shift coordinate value. Also, the secret icon recognition unit 150 ascertains coordinates of each of second and subsequent masquerading icons among the plurality of masquerading icons sequentially selected by the user on the input window, and recognizes secret icons actually inputted from the user by tracing back by the set shift coordinate value from the coordinates of the masquerading icons.

In this way, when the secret icon recognition unit 150 finishes recognizing the secret icons sequentially selected by the user, the authentication request unit 260 ascertains character strings each corresponding to the ascertained secret icons in character string information of the storage unit 220, and generates a combination character string in which the character strings are arranged in a recognition order of the secret icons (S1109).

Subsequently, the authentication request unit 260 requests user authentication by transmitting an authentication request message including the generated combination character string to the authentication server 300 (S1111).

Then, the authentication server 300 authenticates the user of the password input device 200 by ascertaining whether the combination character string included in the authentication request message matches the password stored in S1009 of FIG. 10 (S1113). When the combination character string received from the password input device 200 does not match the stored password, the authentication server 300 transmits an authentication failure notification message to the password input device 200 (S1115). In contrast, when the combination character string received form the password input device 200 matches the stored password, the authentication server 300 transmits an authentication success notification message to the password input device 200 (S1117).

While this specification contains many features, the features should not be construed as limitations on the scope of the disclosure or the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable sub combination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A password input device comprising:
a processor; and
a memory storing instructions that, when executed by the processor, cause the processor to perform the steps of:
storing a character string for each icon in a storage;
generating and displaying an input window where a plurality of icons is shuffled and placed at random;
receiving selection of a first icon by a user on the input window, ascertaining a first secret icon preset by the user, setting movement distance coordinates as a shift coordinate value by comparing coordinates of the first secret icon to coordinates of the first icon, and, from each subsequent icon selected by the user on the input window, recognizing a subsequent secret icon preset by the user by moving back the shift coordinate value from a coordinate value of the subsequent icon on the input window; and
recognizing an icon placed at coordinates moved back by the shift coordinate value from a coordinate value at which the selected icon is placed, as a secret icon selected by the user, when the user selects an icon on the input window;
ascertaining a character string corresponding to the at least one secret icon recognized in the recognizing step, and generating a combination character string in which the ascertained character string is arranged in a recognition order of the secret icon; and
performing authentication of the user using the generated combination character string by ascertaining whether the generated combination character string matches a stored password of the user.

2. The password input device according to claim 1, the instructions further causing the processor to perform the steps of regenerating and displaying an input window where each icon is re-located at random, when an icon is selected on the input window.

3. The password input device according to claim 1, the instructions further causing the processor to perform the steps of: receiving a selection of a plurality of secret icons from the user through the input window, ascertaining character strings corresponding to each of the secret icons in the storage, generating a combination character string in which the character strings are arranged in a selection order of the secret icons, and storing the combination character string as a password of the user in the storage.

4. A method for authenticating a user using an icon combined with an input pattern, the method comprising:
a displaying step of generating and displaying an input window where a plurality of icons is shuffled and placed at random;
a receiving step of receiving selection of a first icon by a user on the input window, ascertaining a first secret icon preset by the user, setting movement distance coordinates as a shift coordinate value by comparing coordinates of the first secret icon to coordinates of the first icon, and, from each subsequent icon selected by the user on the input window, recognizing a subsequent secret icon preset by the user by moving back the shift coordinate value from a coordinate value of the subsequent icon on the input window; and a recognizing step of, when the user selects an icon on the input window, recognizing an icon placed at coordinates moved back by the shift coordinate value from a coordinate value at which the selected icon is placed, as a secret icon selected by the user;

a generating step of ascertaining a character string corresponding to the at least one secret icon recognized in the recognizing step, and generating a combination character string in which the ascertained character string is arranged in a recognition order of the secret icon; and an authentication processing step of performing authentication of the user using the generated combination character string by ascertaining whether the generated combination character string matches a stored password of the user.

5. The method according to claim 4, wherein the authentication processing step performs authentication of the user by transmitting the generated combination character string as a password of the user to an authentication server.

6. The method according to claim 4, wherein the displaying step re-generates and displays, when an icon is selected on the input window, an input window where each icon is re-located at random.

\* \* \* \* \*